M. SHAW.
CREAM DIPPER.
APPLICATION FILED MAY 20, 1918.

1,282,962.

Patented Oct. 29, 1918.

WITNESSES

INVENTOR
M. Shaw,
BY Victor J. Evans
ATTORNEY

UNITED STATES PATENT OFFICE.

MARTHA SHAW, OF SAN BERNARDINO, CALIFORNIA.

CREAM-DIPPER.

1,282,962.   Specification of Letters Patent.   Patented Oct. 29, 1918.

Application filed May 20, 1918. Serial No. 235,609.

*To all whom it may concern:*

Be it known that I, MARTHA SHAW, a citizen of the United States, residing at San Bernardino, in the county of San Bernardino and State of California, have invented new and useful Improvements in Cream-Dippers, of which the following is a specification.

This invention relates to cream dippers and it consists in the novel features hereinafter described and claimed.

An object of the invention is to provide a dipper of the character stated which is of simple structure and which may be readily inserted in the mouth of a bottle and which may separate the cream from the milk and confine the cream so that it may be lifted from the bottle when the dipper is removed therefrom.

With this object in view the dipper comprises a body provided at its lower end with an opening and having a lid applied to the upper end thereof. The lid is provided with a curved opening and the body is provided with a suitable handle. A disk is pivotally mounted upon the bottom of the body and arranged to swing across and from over the opening at the bottom of the body. The disk is provided with a handle which passes through the curved opening in the lid and a cover is pivotally mounted upon the lid and provided with notches adapted to receive the handle whereby it is retained at the position to which it is moved or adjusted.

In the accompanying drawing:—

Figure 1:
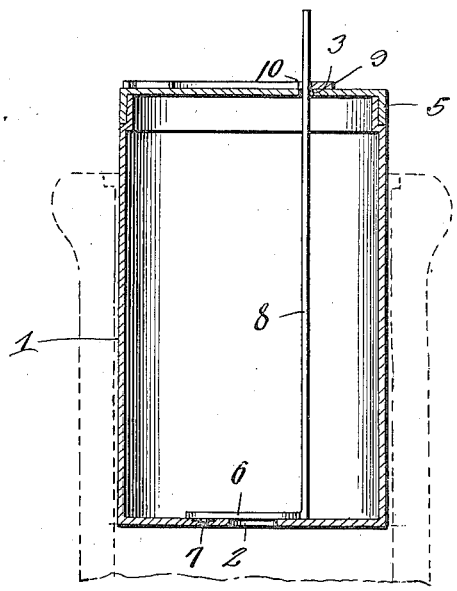
Figure 1 is a vertical sectional view of the cream dipper.
Figure 2:
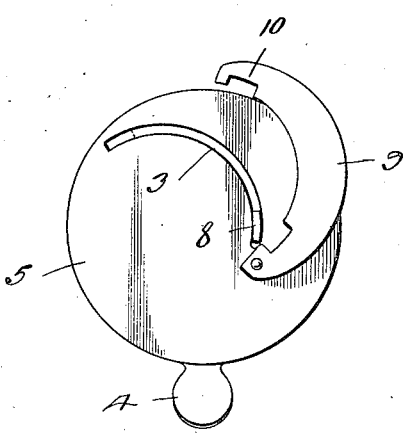
Fig. 2 is a plan view of the cream dipper.
Figure 3:
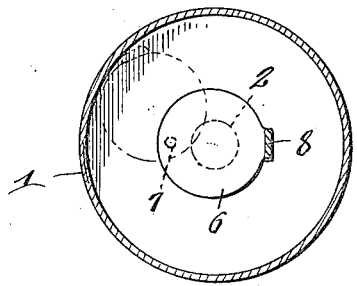
Fig. 3 is a horizontal sectional view of the same.

The dipper comprises a body 1 of tin or other metal and the said body is provided at its bottom with a circular opening 2. The body 1 is provided in the vicinity of its upper edge with a suitable handle 4. A lid 5 is arranged to close the upper end of the body and the said lid is provided with a curved opening 3.

A disk 6 is pivotally mounted as at 7 upon the bottom of the body 1 and the said pivot is preferably in the form of a glove fastening device whereby its members may be readily separated and the disk may be removed from the body when desired for cleansing and other purposes. The disk 6 is provided at its edge with a handle 8 which passes up through the curved opening 3 in the lid 5. A cover 9 is pivotally mounted upon the lid 5 and is provided at its edge with spaced notches 10.

Prior to inserting the dipper in the mouth of a bottle which contains milk and cream the cover 9 is swung away from the handle and the handle 8 is moved along the opening 3 so that the disk 6 is turned on the pivot 7 and removed from over the opening 2 in the bottom of the body 1. The said body is then inserted in the mouth of the bottle and its lower portion is projected below the level of the cream. Consequently the cream will flow through the opening 2 into the body 1 and when the bottom of the body 1 arrives at the lower level or line where the cream rests upon the milk the handle 8 is moved along the opening 3 whereby the disk 6 is moved to a closed position over the opening 2. The cover 9 is then swung toward the handle 8 and one of the notches 10 receives the said handle, consequently the handle is held at a fixed position and the disk 6 is maintained in a closed position over the opening 3. Therefore when the body 1 is lifted out of the mouth of the bottle the cream is carried with the body and removed from the milk. After the body 1 has been removed from the milk bottle it is disposed over a receptacle and the cover 9 is moved away from the handle 8 whereby the said handle may be moved along the opening 3 and the disk 6 removed from over the opening 2 consequently the cream may flow from the body 1 into the receptacle provided for its reception.

From the foregoing description taken in conjunction with the accompanying drawing it will be seen that a cream dipper of simple and durable structure is provided and that the same may be conveniently used for readily removing a volume of cream from a receptacle which contains both cream and milk.

Having described the invention what is claimed is:—

1. A cream dipper comprising a body provided at its bottom with an opening, a cover for the body, said cover having a curved opening, a disk pivoted upon the bottom of the body and arranged to move over the opening therein and away from the same and a handle attached to the disk and passing through the curved opening in the lid.

2. A cream dipper comprising a body provided at its bottom with an opening, a cover for the body and having an opening, a disk pivoted upon the bottom of the body and arranged to move over the opening therein and away from the same, a handle attached to the disk and passing through the opening in the lid, and a cover pivotally mounted upon the lid and having notches adapted to receive said handle.

3. A cream dipper comprising a body provided at its bottom with an opening, a lid for the body and having a curved opening, a cover pivotally mounted upon the lid and having spaced notches, a disk pivotally mounted upon the bottom of the body and arranged to move over the opening therein and away from the same and a handle carried by the disk and passing through the opening of the lid and adapted to be received in the notches of the cover.

In testimony whereof I affix my signature.

Mrs. MARTHA SHAW.